(12) United States Patent
Nozue et al.

(10) Patent No.: US 8,800,060 B2
(45) Date of Patent: Aug. 5, 2014

(54) INFORMATION PROCESSING DEVICE PERFORMING SOFTWARE LICENSE AUTHENTICATION, COMMUNICATION SYSTEM, AND SOFTWARE LICENSE AUTHENTICATION METHOD

(71) Applicant: Hitachi, Ltd., Tokyo (JP)

(72) Inventors: Daiki Nozue, Fujisawa (JP); Ken Oouti, Fujisawa (JP); Takanori Yaginuma, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/776,021

(22) Filed: Feb. 25, 2013

(65) Prior Publication Data

US 2013/0305394 A1    Nov. 14, 2013

(30) Foreign Application Priority Data

May 8, 2012  (JP) ................................. 2012-106393

(51) Int. Cl.
*H04L 29/06* (2006.01)
*G06F 21/10* (2013.01)

(52) U.S. Cl.
CPC ................................ *G06F 21/105* (2013.01)
USPC ......................................................... 726/30

(58) Field of Classification Search
None
See application file for complete search history.

(56) References Cited

U.S. PATENT DOCUMENTS

2008/0005033 A1*  1/2008  Clark et al. .................... 705/59
2010/0241568 A1*  9/2010  Yellai et al. .................... 705/59

FOREIGN PATENT DOCUMENTS

JP            10-143363 A     5/1998

* cited by examiner

*Primary Examiner* — David Pearson
(74) *Attorney, Agent, or Firm* — Mattingly & Malur, PC

(57) ABSTRACT

An information processing device performs software license authentication while sharing the license between an operational system and a standby system in a closed network. A license file and a license key are installed in the operational system. License synchronization starts between the operational system and the standby system. When the operational system fails, the operational system is separated from the closed network, and when a different device is provided, license synchronization is performed between the different device serving as a new standby system and a new operational system (old standby system). When the standby system fails, the standby system is separated from the closed network, and license synchronization is performed between a different device serving as a new standby system and the operational system. A device which retains the license monitors whether or not an unauthorized use of the license is conducted in the closed network.

10 Claims, 19 Drawing Sheets

INFORMATION PROCESSING DEVICE PERFORMING SOFTWARE LICENSE AUTHENTICATION, COMMUNICATION SYSTEM, AND SOFTWARE LICENSE AUTHENTICATION METHOD

CLAIM OF PRIORITY

The present application claims priority from Japanese patent application JP 2012-106393 filed on May 8, 2012, the content of which is hereby incorporated by reference into this application.

BACKGROUND OF THE INVENTION

1. Field of the Invention

The present invention relates to an information processing device performing software license authentication, a communication system, and a software license authentication method.

2. Background Art

As the background art of this technical field, JP-A-10-143363 describes a technique which allows the succession of a license of software being operated in a certain device to a different device. JP-A-10-143363 describes a technique in which a software license issuing device having a software resale function installs a software license in a device different from a device, in which the software license is installed early, and information relating to the license is transferred between a software installing device and the license issuing device (see Abstract and paragraphs [0006] and [0013]).

JP-A-10-143363 describes a technique in which a software license is installed in a device different from a device, in which the software license is installed early, through a software license issuing device as an external device. However, when devices, such as a gateway device and a server, are provided inside a network (hereinafter, referred to as a closed network) unique to a communication carrier or a service provider and is physically or logically separated from an external Internet, communication other than a service to be provided by each device is blocked. For this reason, even when a software license issuing device which communicates with a device inside the closed network is provided outside the closed network, it is not possible to perform license authentication and to allow license succession between the devices inside the closed network.

SUMMARY OF THE INVENTION

Accordingly, the invention provides an information processing device performing software license authentication capable of performing license authentication between a plurality of devices, that is, determining validity of the license even in a device inside a closed network without separately providing a device managing the license, a communication system, and a software license authentication method.

In order to solve the above-described problem, for example, the configuration described in the appended claims is used. Although this application includes multiple means for solving the above-described problem, as an example, an information processing device includes a storage unit which has first device identification information for identifying the information processing device as a host device and an application program executing predetermined processing, and an authentication management unit which has unique information of the application program, wherein the authentication management unit acquires second device identification information for identifying another information processing device from another information processing device to be connected to the information processing device through a communication path, calculates a first value on the basis of the acquired second device identification information, the first device identification information, and the unique information, generates a first authentication key on the basis of the calculated first value, the first device identification information, and the second device identification information, transmits the generated first authentication key to another information processing device, acquires the second device identification information from another information processing device for each predetermined period, calculates a second value on the basis of the acquired second device identification information, the first device identification information, and the unique information, compares the calculated second value with the first value of the first authentication key, and when the second value does not coincide with the first value, stops the activation of the application program.

According to the invention, it is possible to provide an information processing device performing software license authentication which performs license authentication between a plurality of devices even in a device inside a closed network without separately providing a device managing the license, a communication system, and a software license authentication method.

The above and other objects, configuration, and effects will be apparent from the description of the following embodiments.

DETAILED DESCRIPTION OF THE INVENTION

Hereinafter, examples of the invention will be described with reference to the drawings.

Example 1

Figure 1:
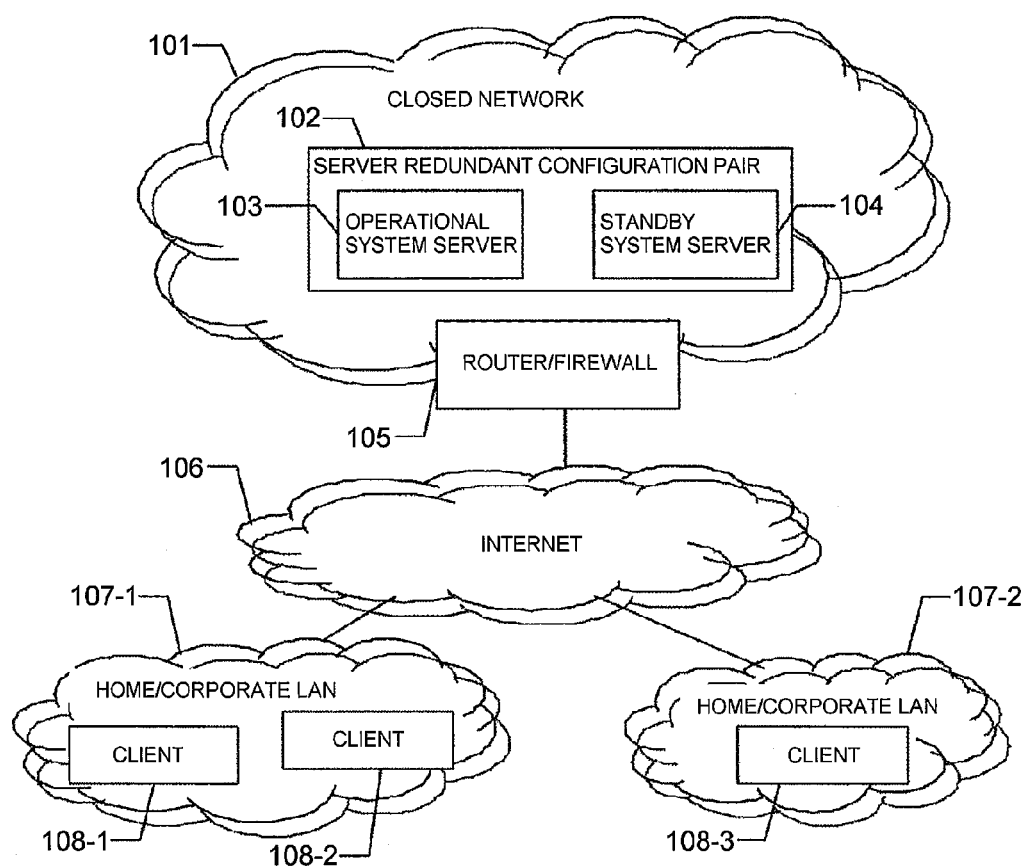
FIG. 1 is a network configuration diagram.

For example, an operational system device and a standby system device having a redundant configuration will be described as a device which performs license authentication between a plurality of devices and allows license succession. FIG. 1 is a network configuration diagram in this example. This is a general form in which a server provides a service to a client 108 of a home/corporate LAN (Local Area Network) 107 through Internet 106. In general, a router/firewall 105 is provided at the gate of a closed network 101, and communication other than a service to be provided by the server is blocked by a firewall. The server is a redundant configuration pair 102 which has an operational system server 103 and a standby system server 104. In this example, one operational system is provided, and one standby system is provided.

Although in this example, a server having a redundant configuration will be described, a device having a redundant configuration is not limited to a server and may be a gateway device or a packet switching device.

Figure 2:
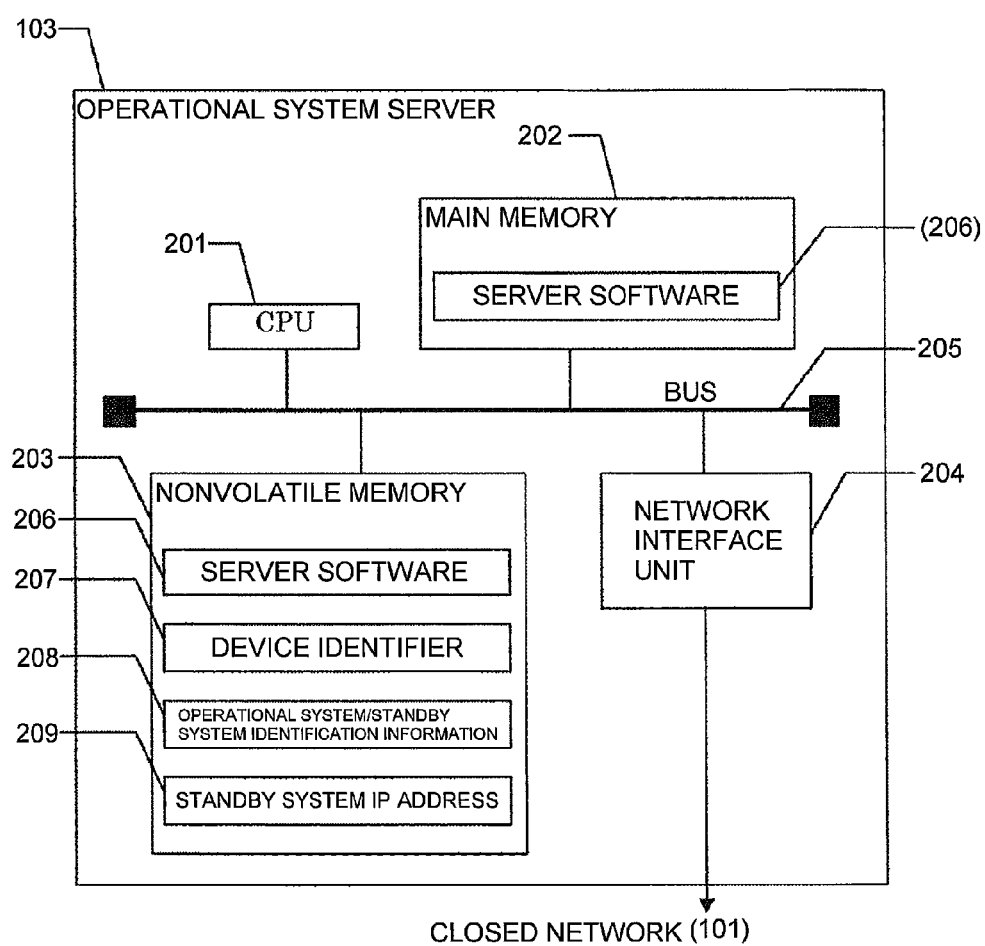
FIG. 2 is a server configuration diagram.

FIG. 2 is a hardware configuration diagram of a server. Although the operational system server 103 is described, since the operational system server 103 and the standby system server 104 have the same configuration, only the operational system server 103 is representatively described. As described below, the operational system and the standby system change the roles by system switching, and it is not just that the role of each device is fixed.

The operational system server 103 has a CPU 201, a main memory 202, a nonvolatile memory 203, a network interface unit 204, and a bus 205 which connects these units. The sever of this example may have devices other than the devices described in FIG. 2, such as a disk drive, a keyboard, and a display device. The server is connected to the closed network 101 through the network interface unit 204. The operational system server 103 and the standby system server 104 perform communication (hereinafter, referred to as inter-system communication) between the systems through the closed network 101.

The nonvolatile memory 203 stores a device identifier 207 which is information for uniquely identifying server software 206 or the host device and operational system/standby system identification information 208. The operational system/standby system identification information 208 represents whether the device having the nonvolatile memory 203 is operating as an operational system or a standby system. A standby system IP (Internet Protocol) address 209 is stored when the host device is an operational system, that is, when the value of the operational system/standby system identification information 208 represents an operational system, and is used during inter-system communication with the standby system server 104. In the main memory 202, the server software 206 read from the nonvolatile memory by the CPU 201 is operating.

In the following description, although processing will be described using a "program" as a subject in some cases, a program is executed by the CPU 201 and a defined processing is executed using the main memory 202, the nonvolatile memory 203, and the network interface unit 204, whereby a subject of processing may also be the CPU 201. Processing which is disclosed using a program as a subject may also be processing which is performed by the operational system server 103 or the standby system server 104.

Figure 3:
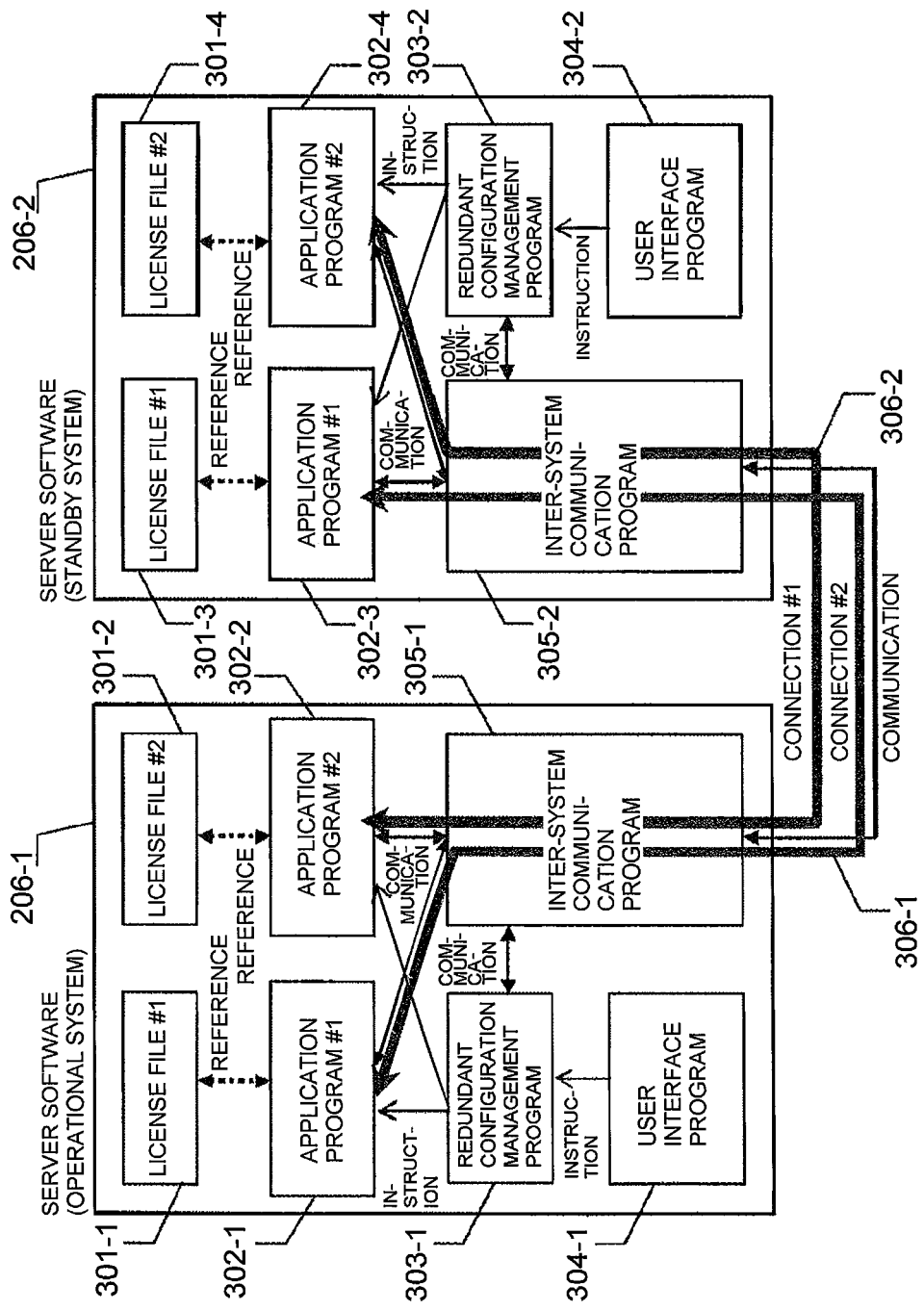
FIG. 3 is a server software configuration diagram.

FIG. 3 is a configuration diagram of the server software 206, and shows the relationship between application programs 302-1 to 302-4, license files 301-1 to 301-4, redundant configuration management programs 303-1 and 303-2, inter-system communication programs 305-1 and 305-2, and user interface programs 304-1 and 304-2. One of the two servers which becomes an operational system is designated by the user through the user interface programs 304-1 and 304-2, and set in the redundant configuration management programs 303-1 and 303-2.

The designation by the user is not necessarily performed for both servers, and for example, it should suffice that one server is designated as an operational system or a standby system. The other server is set by inter-system communication in the closed network 101 through the inter-system communication programs 305-1 and 305-2.

Although in FIG. 3, communication between the operational system and the standby system is performed through the inter-system communication programs 305-1 and 305-2, a form in which the redundant configuration management programs 303-1 and 303-2 or the application programs 302-1 to 302-4 have an inter-system communication function may be made. Although in this example, a form in which the inter-system communication programs 305-1 and 305-2 are independent from the application programs 302-1 to 302-4 is described, an example in an incorporative form is the same as described below.

The redundant configuration management program 303-1 activates the application programs 302-1 and 302-2 only when the value of the operational system/standby system identification information 208 represents an operational system. The redundant configuration management program 303-2 of the standby system server 104 activates the application programs 302-3 to 302-4 in an operation mode (an operation to receive service-related information from the operational system is performed) as a standby system. In order to execute the application programs #1 302-1 and 302-3 and #2 302-2 and 302-4, the license files 301-1 to 301-4 are required, it is confirmed whether or not the license files #1 301-1 and 301-3 or #2 301-2 and 301-4 are valid, and if the license files are valid, the application programs #1 302-1 and 3 and #2 302-2 and 302-4 can be executed.

In this example, the definition of the validity of the license will be described below. The application program #1 302-1 of the operational system server 103 establishes a connection #1 306-1 with the application program #1 302-3 of the standby system server 104, the application program #2 302-2 of the operational system server 103 establishes a connection #2 306-2 with the application program #2 302-4 of the standby system server 104, and communication is performed.

Figure 4:
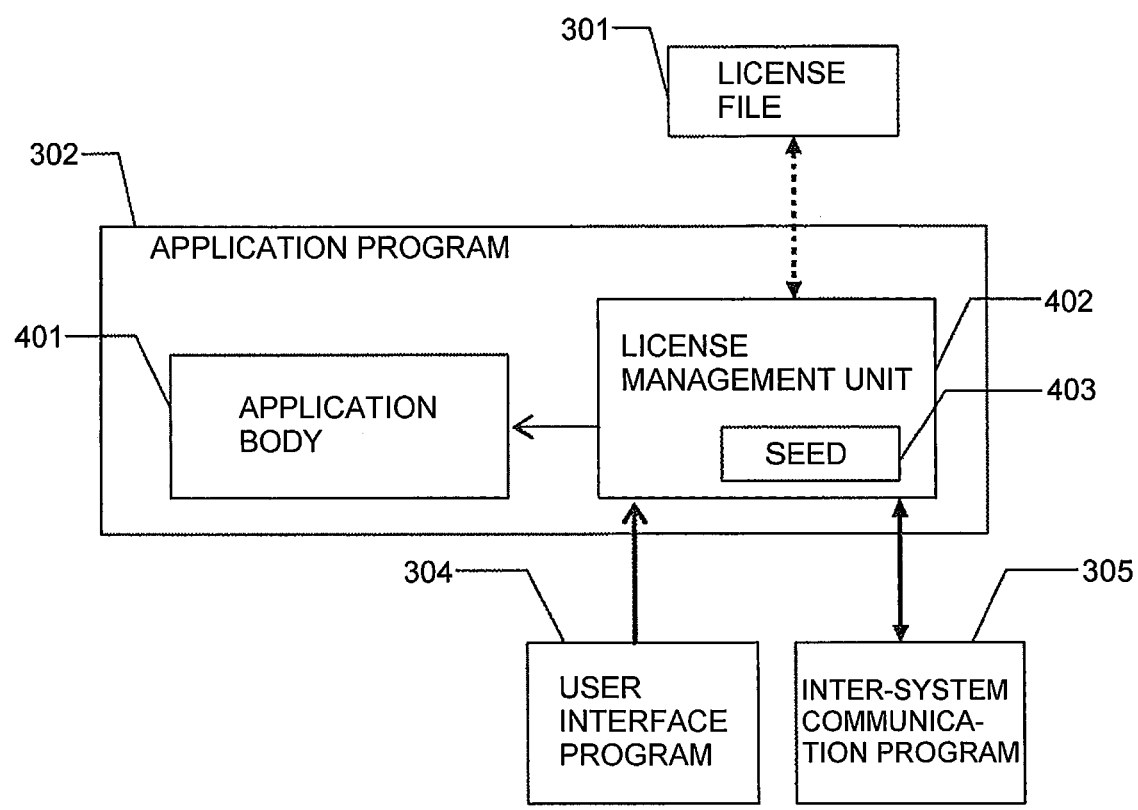
FIG. 4 is an application program configuration diagram.

FIG. 4 shows the internal configuration of the application program 302. The application program 302 has an application body 401 and a license management unit 402. The license management unit 402 performs operations, such as license installation in the device, license file authentication, license synchronization, license cross-check, and monitoring of an unauthorized use of a license by another device. The license file 301 is allocated to each application program 302. That is, different application programs 302 have different license files 301.

The license management unit 402 has a seed 403. The seed 403 is a character string or a numerical value which is used when generating a license key, and is unique information of the application program 302. For this reason, in the same application program 302, the seed has a common value for all devices. It should suffice that the seed 403 is created simultaneously when the application program is created and integrated. The seed 403 is integrated in the license management unit 402 as a part of program data, and thus the user cannot directly read the seed from the outside of the device or cannot rewrite the seed.

License installation by the license management unit 402 is carried out in accordance with a user instruction through the user interface program 304. The user interface program 304 is an interface program which is used when the user controls the device using means, such as a GUI (Graphical User Interface). The license management unit 402 performs the authentication of the license file 301 at the time of license installation or license synchronization. If the license file 301 is valid, the application body 401 is activated, and if the license file 301 is invalid, the application body 401 is not activated or stopped during activation.

License synchronization is carried out while inter-system communication is performed between the operational system server 103 and the standby system server 104 through the inter-system communication programs 305-1 and 305-2. The details of license synchronization will be described.

Although the application body 401 is a service which is provided to a client by the server, for example, a Web server application, a file management application, a user management program in various gateway devices which are provided by a communication carrier, or a communication protocol conversion program, this example is not limited to an application for specific use.

Figure 5:
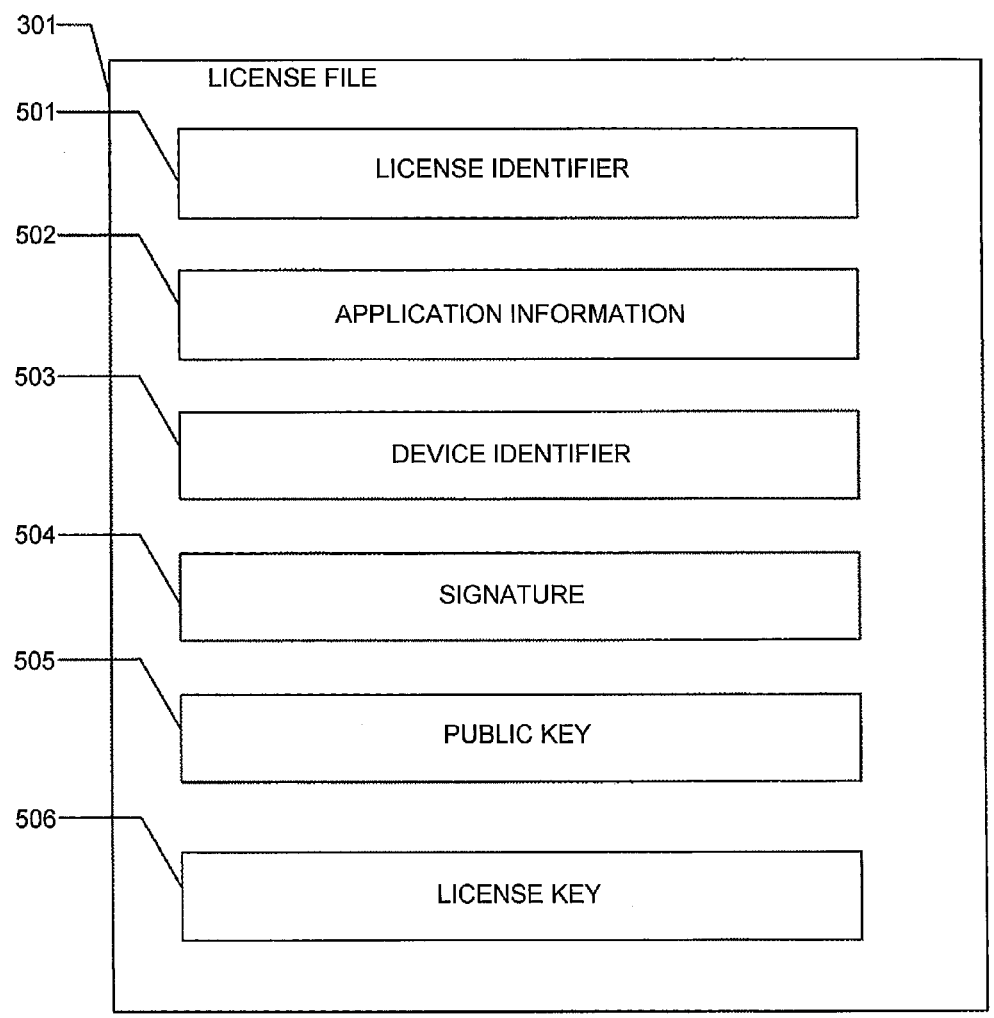
FIG. 5 is a license file configuration diagram.

FIG. 5 shows the internal configuration of the license file 301. The license file 301 has the same details between the operational system server 103 and the standby system server 104.

The license file 301 includes a license identifier 501, application information 502, a device identifier 503, a signature 504, a public key 505, and a license key 506.

The license identifier 501 is identification information for identifying the license file 301, and differs between the license files 301. The license identifier 506 may be identification information for identifying the license key 506 described below. The application information 502 represents the application program 302 to which the license file 301 corresponds. The device identifier 503 is identification information for identifying a device in which the license file 301 is installed initially, and for example, a MAC (Media Access Control) address of the device or the like is appropriately used. When the user applies for a license, identification information of the device is transmitted to the license source, the license source writes the identification information of the device in the license file 301 as the device identifier 503.

The signature 504 is obtained by calculating the hash value of information regarding the license identifier 501, the application information 502, and the device identifier 503, and encrypting the hash value using a secret key in the license source through a public key encryption scheme. That is, when the signature 504 is Sign, the license identifier 501 is L_ID, the application information 502 is AP_INF, the device identifier 503 is ID_S, a one-way function for calculating the hash value is f, the secret key is Sec_KEY, and a public key encryption function is P, Sign is obtained by the following calculation.

$$Sign=P(f(L\_ID|AP\_INF|ID\_S),Sec\_KEY)$$

Here, | represents that data is arranged successively.

The reason for the license key 506 being not subjected to the signature 504 is that the details of the license key 506 are updated at the time of license synchronization as described below.

The public key 505 corresponds to the secret key of the license source, and is used for the verification of the signature 504 when the license management unit 402 confirms the validity of the license file 301.

The verification of the signature 504 is performed by comparing a hash value obtained by decrypting the signature 504 with the public key 505 with the hash value of information regarding the license identifier 501, the application information 502, and the device identifier 503, and determining whether or not the hash values coincide with each other.

That is, when the signature 504 is Sign, the public key 505 is Pub_KEY, and the hash value obtained by decryption is H_dec, the following expression is obtained.

$$H\_dec=P(Sign,Pub\_KEY)$$

When the hash value of information regarding the license identifier 501, the application information 502, and the device identifier 503 is H, the following expression is obtained.

$$H=f(L\_ID|AP\_INF|ID\_S)$$

The verification of the signature 505 is performed in accordance with whether or not H and H_dec coincide with each other.

The license key 506 is used for confirming the validity of the license at the time of regular license check described below. The license key 506 is generated at the time of license installation in a device, and the details thereof are updated at the time of license synchronization or the like.

Figure 6:
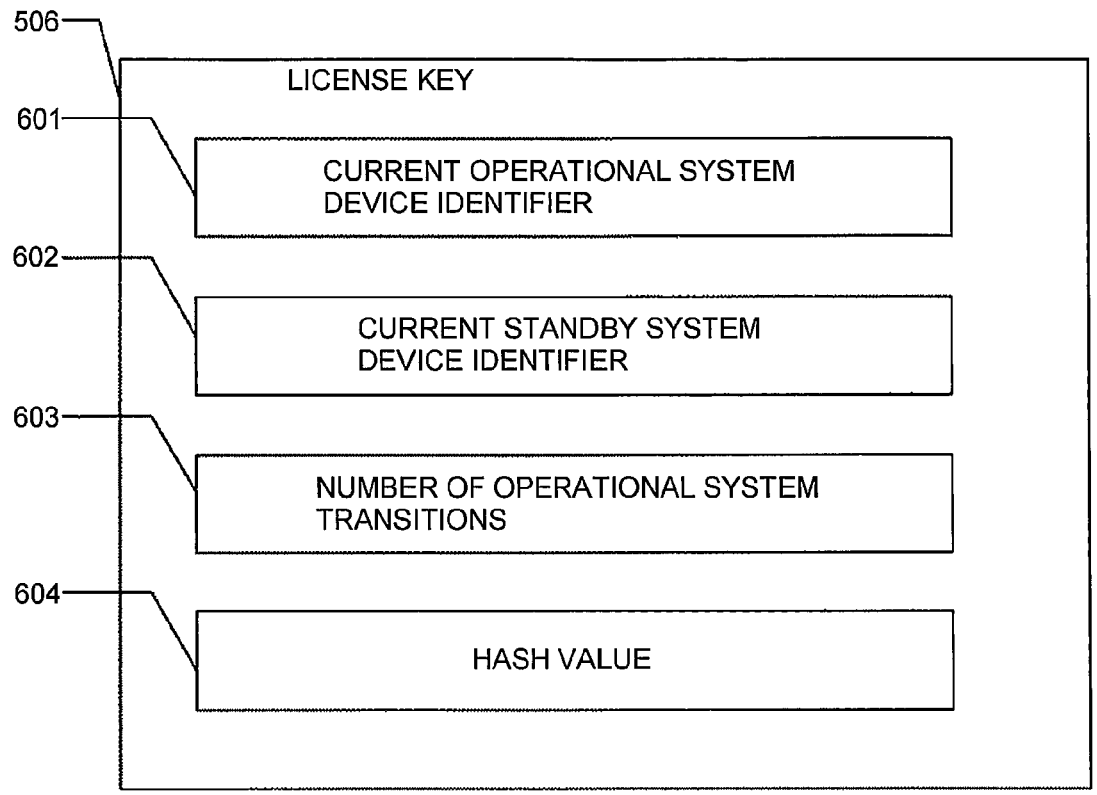
FIG. 6 is a license key configuration diagram.

FIG. 6 shows the configuration of the license key 506. The license key 506 has a current operational system device identifier 601, a current standby system device identifier 602, the number of operational system transitions 603, and a hash value 604. The current operational system device identifier 602 is written with the device identifier of the device as the operational system server 103. At the time of license installation in the device, the current operational system device identifier 602 is the same as the device identifier 503 in the license file 301. The current standby system device identifier 602 is the device identifier of the standby system server 104 which is received from the device as the standby system server 104 by license synchronization described below. The number of operational system transitions 603 is a number which is added when device replacement is performed due to failure or the like and when the operational system is transited to a different device other than the current standby system, and the initial value thereof is 0. It may be assumed that the number of operational system transitions 603 is not added when the operational system and the standby system are switched in the same redundant configuration pair by an operational policy.

The hash value 604 is generated from information regarding the seed 403, the current operational system device identifier 601, the current standby system device identifier 602, and the number of operational system transitions 603.

That is, if the hash value 604 is H_Lic, the seed 403 is S, the current operational system device identifier 601 is ID_A, the current standby system device identifier 602 is ID_B, and the number of operational system transitions 603 is CNT, for example, H_Lic is generated as follows using a one-way function g with sufficient strength.

$$H\_Lic=g(S|ID\_A|ID\_B|CNT)$$

Here, | is as described above, and represents that data is arranged successively. Of course, the hash value 604 is not limited to the above, includes at least the seed 403, the current operational system device identifier 601, and the current standby system device identifier 602, and may be arbitrary insofar as these values cannot be inferred from the hash value 604.

The reason for using the seed 403 for the calculation of the hash value 604 is to prevent the license key 506 from being generated in an unauthorized manner by means of the condition that the seed 403 is difficult to be read from the outside. Unauthorized license monitoring described below can be realized by means of the condition that the hash value cannot be generated in an unauthorized manner.

Figure 7:
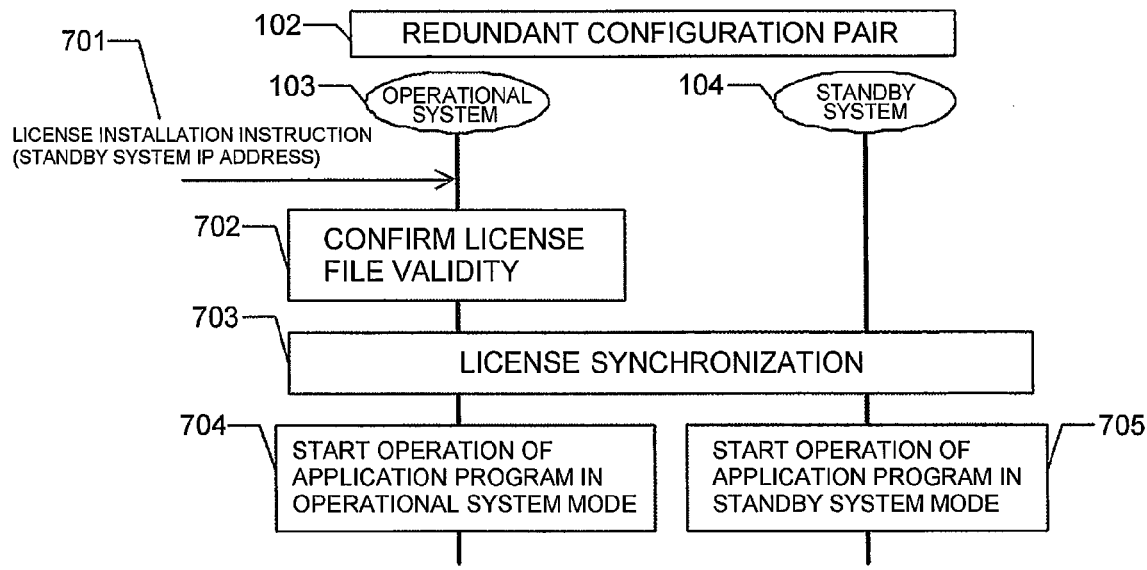
FIG. 7 shows a sequence at the time of installation of a license.

FIG. 7 shows an operation sequence of the operational system server 103 and the standby system server 104 at the time of license installation. In this example, license installation is performed only for the operational system server 103.

In license installation, the user gives the license file 301 in a license installation instruction 701 and an IP address of the standby system server for communication between the operational system server 103 and the standby system server 104 to the operational system server 103. If the validity of the license file 301 is confirmed (702), the operational system server 103 performs license synchronization (703) with the standby system server 104. At this time, the operational system server 103 and the standby system server 104 retain (hereinafter, referred to as sharing) the license files 301 having the same details. The device identifier 503 in the license file 301 is only for the operational system server 103, and as described below, the license key 506 is generated using the device identifiers of the operational system server 103 and the standby system server 104, whereby an arbitrary device cannot be used as a standby system for the operational system server 103.

If the validity of the license file 301 is confirmed (702) and the license synchronization (703) is performed, the operational system server 103 activates the application program 302 in a normal mode. The normal mode refers to a mode in which a service is provided by the application program 302.

The standby system server 104 acquires the license file 301 from the operational system server 103 by the license synchronization (703) to activate the application program 302. The standby system server 104 activates the application program 302 in a standby system-dedicated mode. The standby system-dedicated mode refers to a mode in which the application program 302 is activated but does not provide a service.

When there is no standby system server corresponding to the IP address of the standby system server designated at the time of the license installation (701), while the driving (the activation of the application program 302) can be started only with the operational system server 103, the effect that there is no standby system server may be notified to the user by screen display or the like, and the driving may not be started.

Figure 8:
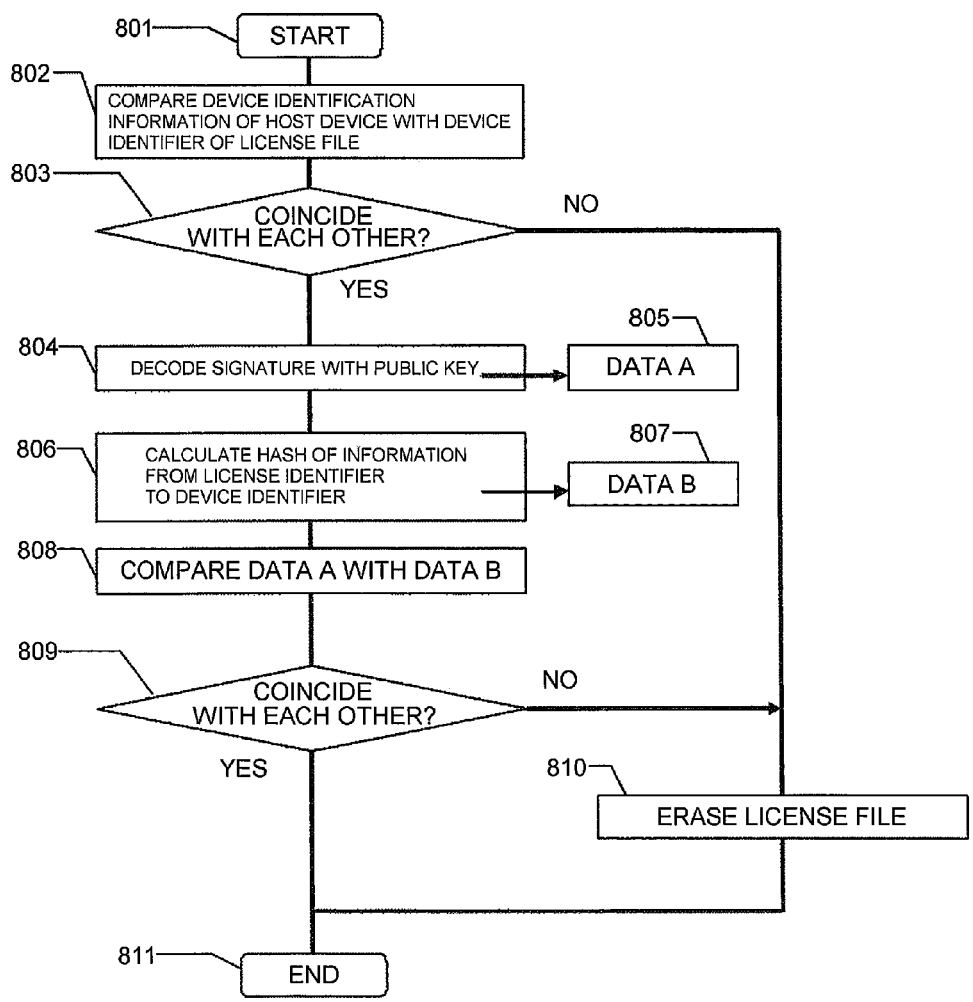
FIG. 8 is a flowchart of a validity confirmation operation at the time of installation of a license.

FIG. 8 is a flowchart of a validity confirmation operation (702) at the time of the installation of the license file 301 by the operational system server 103. First, the operational system server 103 compares the device identifier 207 of the host device with the device identifier 503 of the license file 301 (802), and if both coincide with each other (YES in 803), decrypts the signature 504 of the license file 301 using the public key 505 of the license file 301 (804). Data obtained by decryption is referred to as data A (805). An encryption scheme to be used may be determined by a program in advance. Subsequently, the hash value of information regarding the license identifier 501 of the license file 301, the application information 502, and the device identifier 503 is calculated (806), and the result is referred to as data B (807). Data A (805) and data B (807) are compared with each other (808), if both coincide with each other (YES in 809), it is determined that the validity of the license file 301 is confirmed, and the validity confirmation operation ends (811).

When the comparison result shows that the device identifier 207 of the host device and the device identifier 503 of the license file 301 do not coincide with each other (NO in 803), the license file 301 is erases (810), and the validity confirmation operation ends (811). Alternatively, when the comparison result (808) shows that data A (805) and data B (807) do not coincide with each other (NO in 809), the license file 301 is erased (810), and the validity confirmation operation ends (811).

Figure 9:
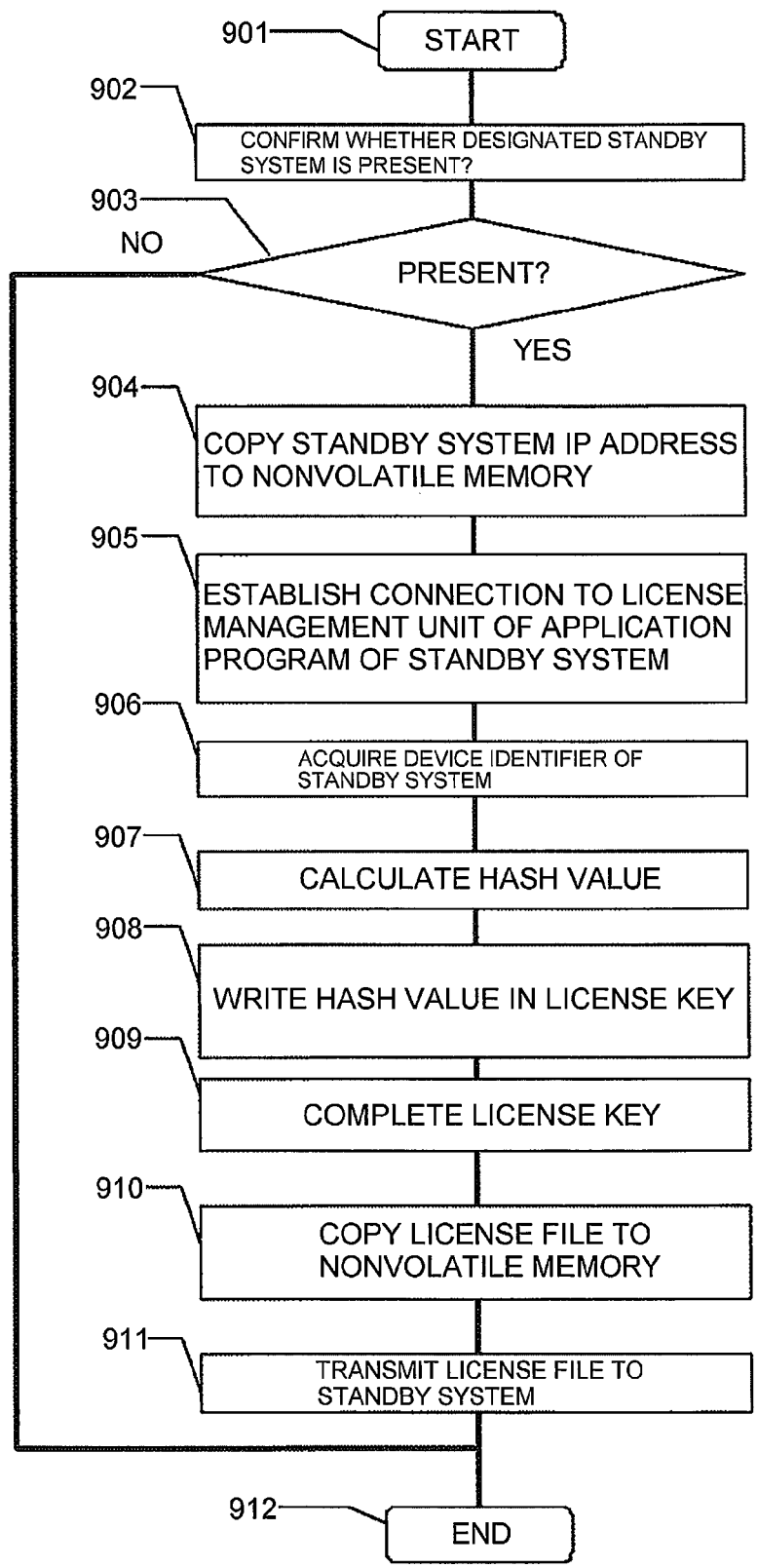
FIG. 9 is a flowchart of license synchronization in an operational system server.

FIG. 9 is a flowchart of the license synchronization (703) by the license management unit 402 of the operational system server 103. First, it is confirmed whether or not there is a standby system server 104 on the basis of the IP address of the standby system server 104 designated (701) at the time of the installation (902). The confirmation may be executed by a method, for example, ping or the like. When there is the designated standby system server 104 (YES in 903), the IP address of the standby system server 104 is retained in the standby system IP address 209 of the nonvolatile memory 203 (904).

Next, a connection with the license management unit 402 of the application program 302 of the standby system server 104 is established using the standby system IP address 209 (905). In regard to this, a connection of TCP (Transmission Control Protocol) is established between the license management units 402 of the application programs 302 of the operational system server 103 and the standby system server 104.

Next, the device identifier of the standby system server 104 is acquired using the established connection (906) and written in the current standby system device identifier of the license key 506. Subsequently, a hash value is calculated from the seed 403, the operational system device identifier 601 of the license key 506 of the license file 301, the acquired device identifier of the standby system server 104, and the number of operational system transitions 603 of the license key 506 of the license file 301 (907). The calculated hash value is written in the hash value 604 of the license key 506 of the license file 301 (909). Accordingly, the license key 506 is completed (908).

The license file 301 in which the license key 506 is completed is stored in the nonvolatile memory 203 (910) and transmitted to the standby system server 104 (911), and the license synchronization processing ends (912).

When there is no designated standby system server 104 (NO in 903), the license synchronization processing ends with doing nothing (912). This may be, for example, a case where the standby system server 104 fails, or the like.

Figure 10:
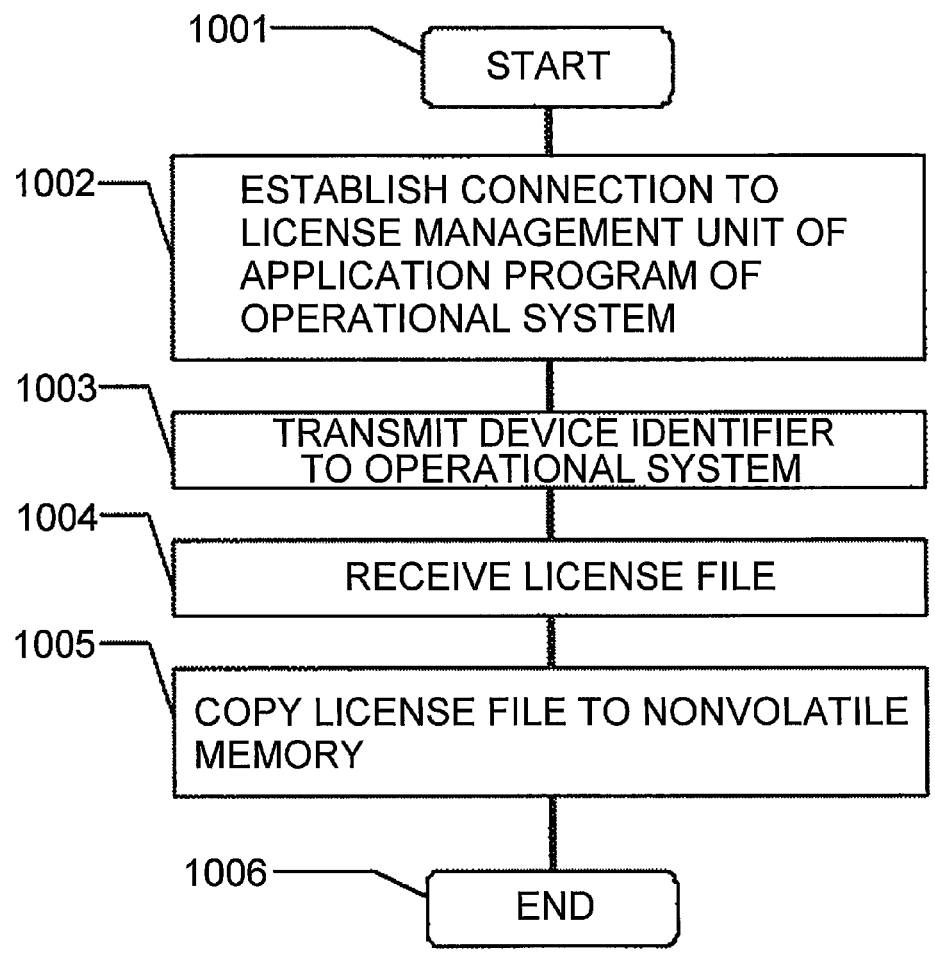
FIG. 10 is a flowchart of license synchronization in a standby system server.

FIG. 10 is a flowchart of the license synchronization (703) by the license management unit 402 of the standby system server 104. First, a connection with the operational system server 104 is established in accordance with an instruction from the operational system server 103 (1002). Next, the device identifier of the host device is transmitted to the operational system server 104 in accordance with an instruction from the operational system server 103 (1003). Next, the license file 301 is received from the operational system server 103 and stored as the license file 301 in the server software 206 of the nonvolatile memory 203 (910).

In this step, the operational system server 103 and the standby system server 104 share the license files 301 having the same details. When the license file 301 including the generated license key 506 is copied to a different device in an unauthorized manner, as described below, the application program 302 is stopped.

Figure 11:
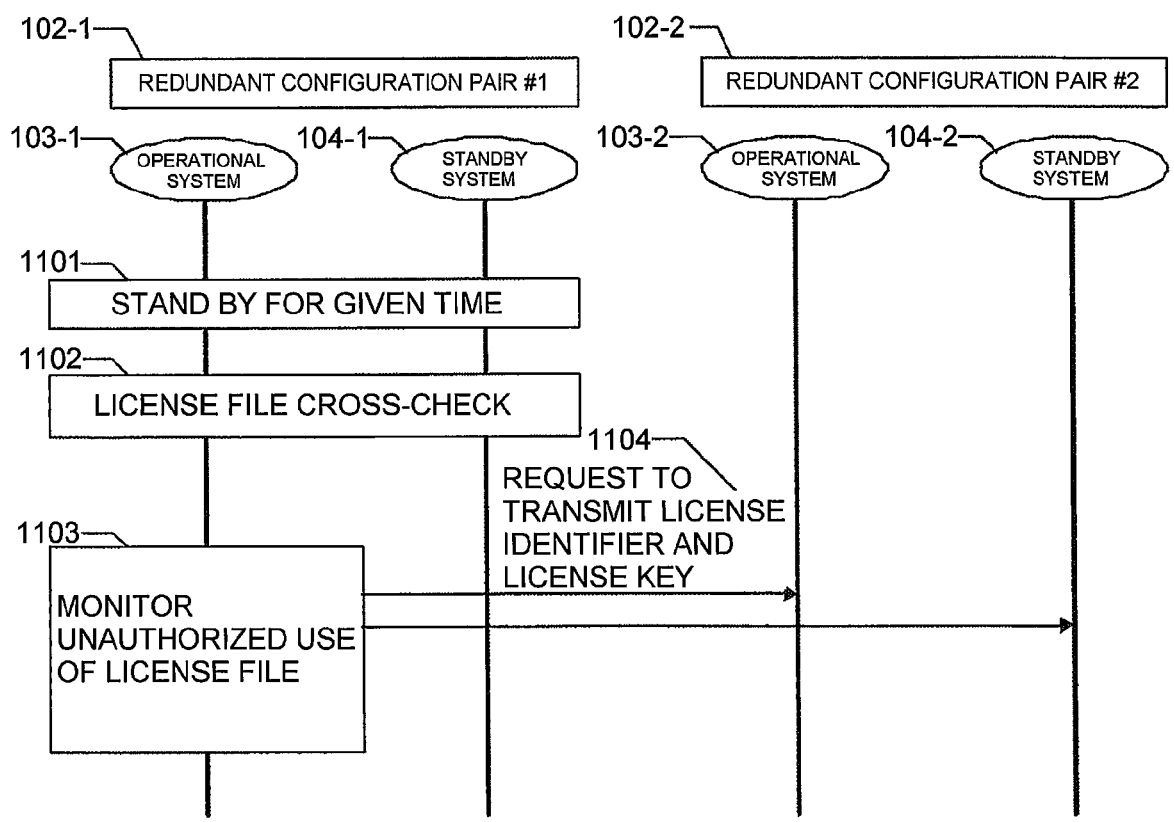
FIG. 11 shows a license monitoring sequence during normal driving of a server.

FIG. 11 shows a license monitoring sequence during normal driving after the installation. It is assumed that there are two redundant configuration pairs 102 of a redundant configuration pair #1 102-1 and a redundant configuration pair #2 102-2. Hereinafter, although a license monitoring sequence which is carried out by the redundant configuration pair #1 102-1 will be described, as well as the redundant configuration pair #1 102-1, the redundant configuration pair #2 102-2 of course carries out the license monitoring.

An operational system server 103-1 of the redundant configuration pair #1 102-1 stands by for a given time (1101), and then carries out license file cross-check (1102) with a standby system server 104-1. Next, unauthorized license file monitoring on whether there is an unauthorized use of the license file 301 is performed (1103). With the unauthorized license file monitoring (1103), the operational system server 103-1 of the redundant configuration pair #1 102-1 requests another device in the closed network 101 to transmit the license identifier 501, the license key 506, and the like (1104). The unauthorized license file monitoring (1103) will be described below.

The license file cross-check (1102) and the unauthorized license file monitoring (1103) are carried out every given time. The redundant configuration pair #2 102-2 also carries out the license file cross-check (1102) and the unauthorized license file monitoring (1103) at a different timing from the redundant configuration pair #1 102-1.

Figure 12:
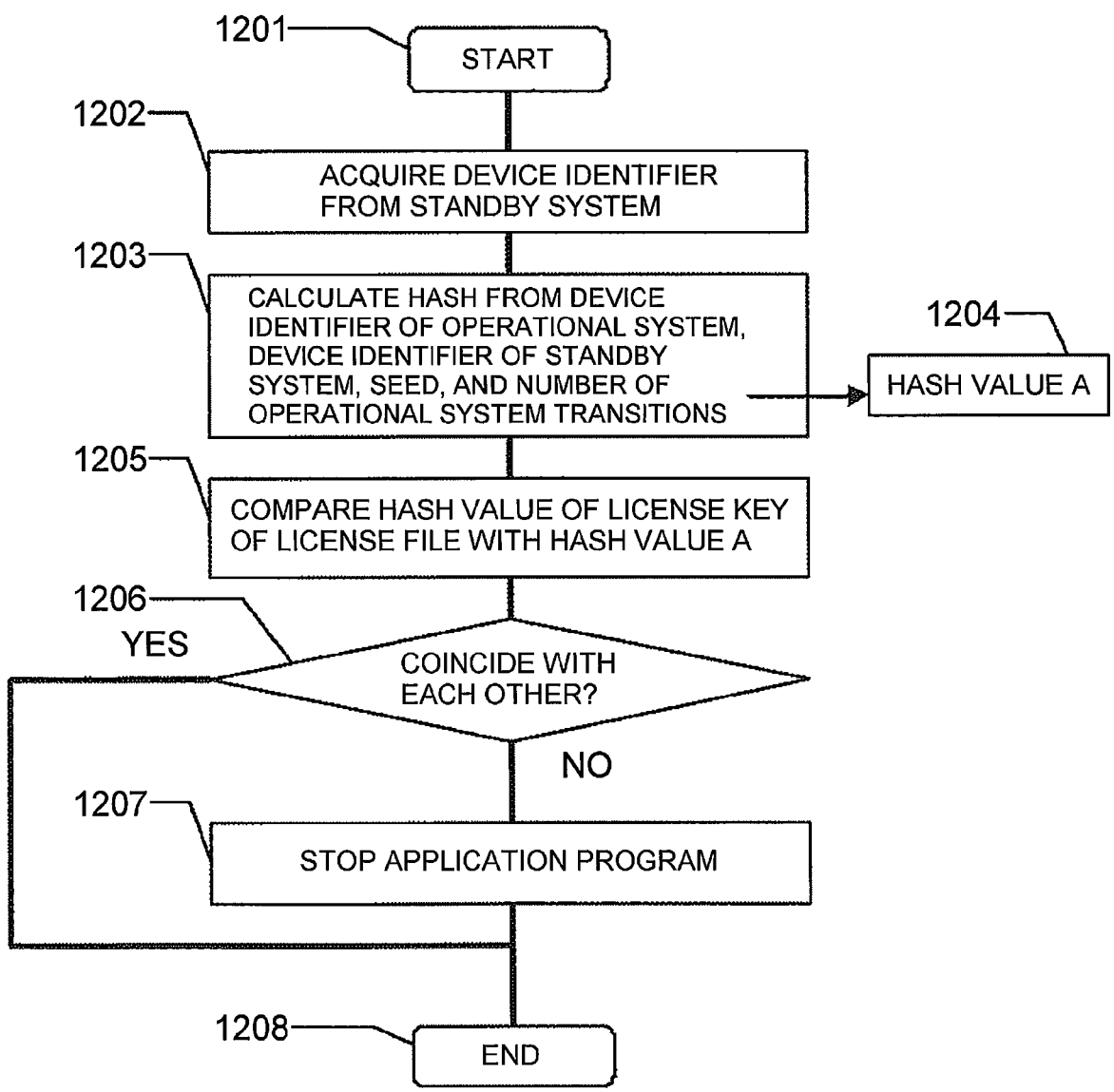
FIG. 12 is a license cross-check flowchart of an operational system server.

FIG. 12 is a flowchart of the license cross-check (1102) by the license management unit 402 of the operational system server 103. First, the device identifier of the standby system server 104 is acquired from the standby system server 104 using the connection with the standby system server 104 (1202). Next, a hash value is calculated from the current operational system device identifier 601 of the license key 506 of the license file 301 of the operational system server 103, the acquired device identifier of the standby system server 104, the number of operational system transitions 603 of the license key 506 of the license file 301, and the seed 403 (1203). This hash value is set as a hash value A (1204). The hash value 604 of the license key 506 of the license file 301 and the hash value A (1204) are compared with each other (1205), and if both coincide with each other (YES in 1206), the processing ends (1208). If both do not coincide with each other (NO in 1206), the application program 302 of the operational system server 103 is stopped (1207), and the processing ends (1208).

Figure 13:
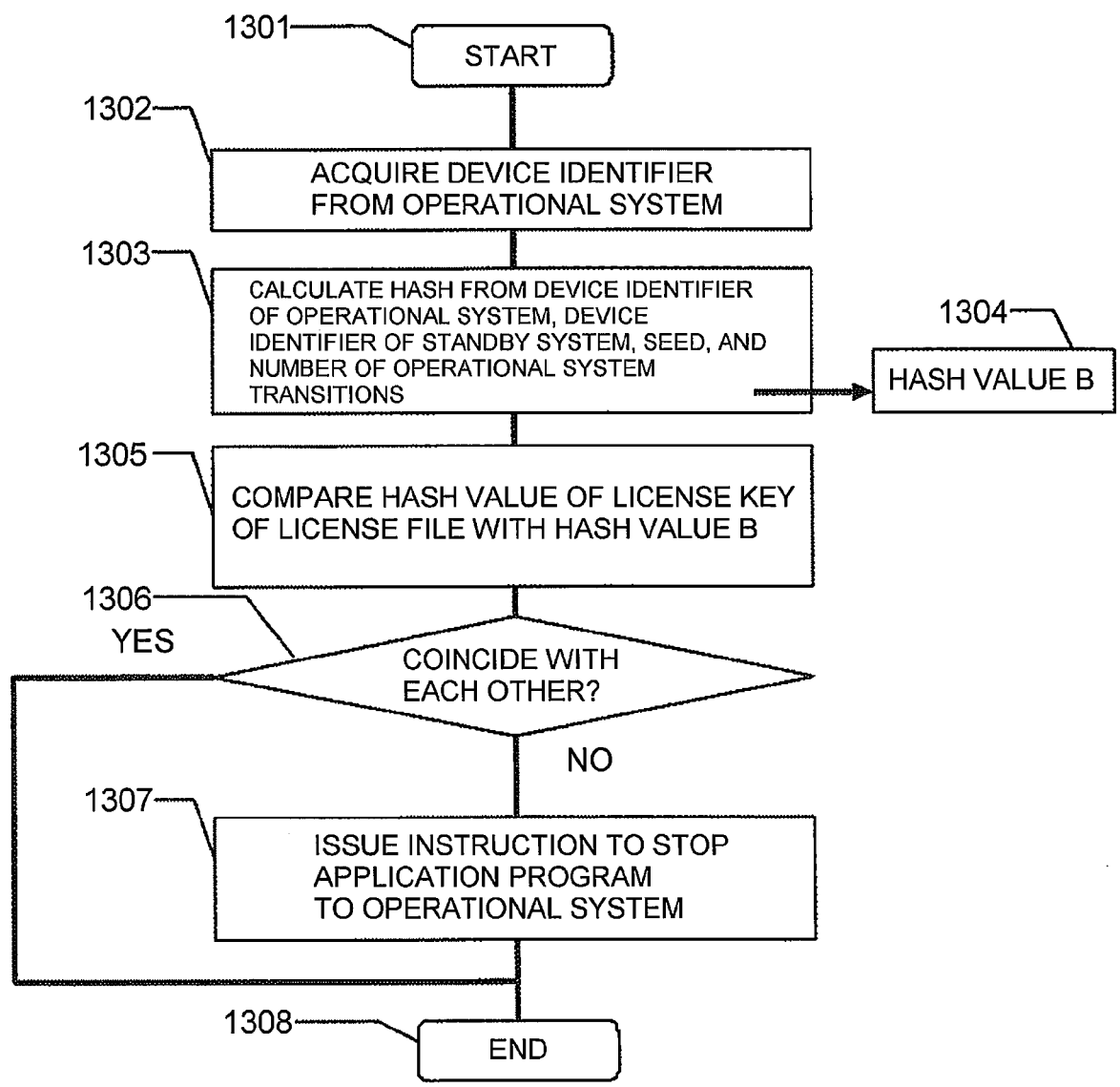
FIG. 13 is a license cross-check flowchart of a standby system server.

FIG. 13 is a flowchart of the license cross-check (1102) by the standby system server 104. First, the device identifier of the operational system server 103 is acquired from the operational system server 103 using the connection with the operational system server 103 (1302). Next, a hash value is calculated from the acquired device identifier of the operational system server 103, the current standby system device identifier 602 of the license key 506 of the license file 301 of the standby system server 104, the number of operational system transitions 603, and the seed 403 (1303). This hash value is set as a hash value B (1304). The hash value 604 of the license key 506 of the license file 301 of the standby system server 104 and the hash value B (1304) are compared with each other (1305), and if both coincide with each other (YES in 1306), the processing ends (1308). If both do not coincide with each other (NO in 1306), an instruction to stop the application program 302 is issued to the operational system server 103 (1307).

Figure 14:
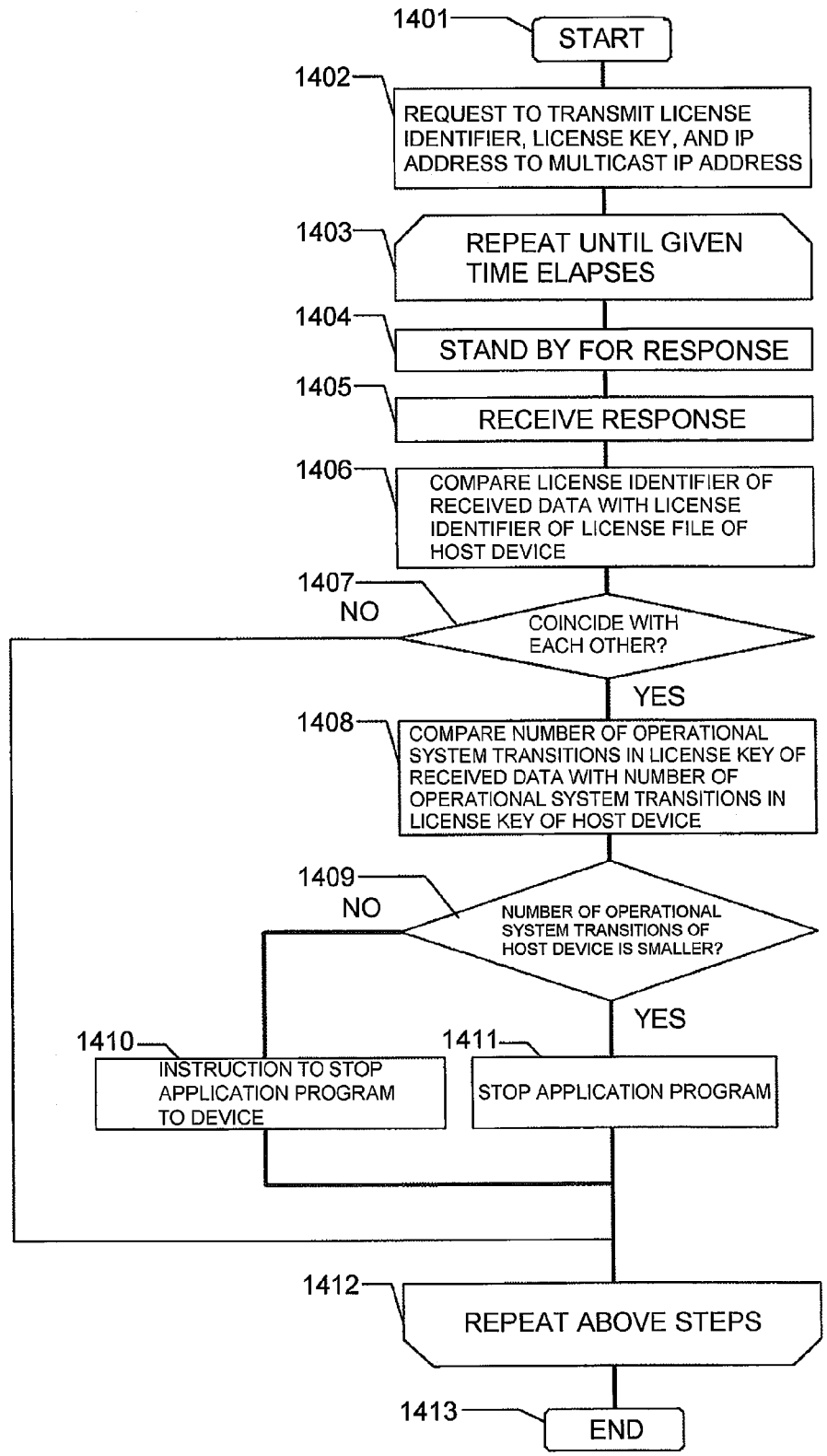
FIG. 14 is a flowchart of monitoring of an unauthorized use of a license.

FIG. 14 is a flowchart of the unauthorized license use monitoring operation (1103) by the license management unit 402 of the operational system server 103. First, a request to acquire the license identifier 501, the license key 506, and the IP address is issued to a prescribed multicast IP address (1402). A license management unit of a device which receives the acquisition request addressed to the multicast IP address is configured to transmit the license identifier, the license key, and the IP address as response data.

Next, the following processing is repeated a prescribed number of times or until a prescribed time elapses (1403 to 1412). First, it stands by for a response to the request issued to the multicast IP address (1404).

If response data from a certain device is received (1405), the license identifier of the received response data and the license identifier 501 of the license file 301 of the host device are compared with each other (1406). When both do not coincide with each other (NO in 1407), it stands by for a response again (1404) or if the upper limit of the number of repetitions is reached, the processing ends (1413). When both coincide with each other (YES in 1407), either the transmission source device of the received response data or the host device uses the license in an unauthorized manner.

In this case, first, the operational system server 103 compares the number of operational system transitions 603 of the license key 506 of the received response data and the number of operational system transitions 603 of the license key 506 of the license file 301 of the host device are compared with each other (1408), and if the number of operational system transitions 603 of the host device is smaller (YES in 1409), it is regarded that the host device uses the license in an unauthorized manner, and the application program 302 is stopped (1411).

If the number of operational system transitions 603 of the host device is greater (NO in 1409), it is regarded that the transmission source device of the received response data uses the license file 301 in an unauthorized manner, and an application program stop instruction is issued to the transmission source device (1410).

When both the numbers of operational system transitions 603 are identical, the application program stop instruction is issued to the transmission source device. The license unauthorized use monitoring operation (1103) is executed at a different timing by the operational system server 103 of each redundant configuration pair 102, whereby the previously detected operational system server 103 of the redundant configuration pair 102 stops the application program 302 which is executed by the operational system server 103 of another redundant configuration pair 102. The operational system server 103 of the redundant configuration pair 102 which issues the application program stop instruction continues to be operated since the operational system server which issues the application program stop instruction to the host device disappears. In this case, only the application programs of the operational system server for the number of licenses can be operated.

The reason for the device having a large number of operational system transitions 603 uses the valid license file 301 is that it is considered the number of operational system transitions 603 is added each time the operational system server is replaced with a new device due to device replacement caused by failure or the like, whereby a device having a smaller number of operational system transitions 603 is removed by replacement, and the license will be used again without being updated.

If the number of operational system transitions 603 is rewritten intentionally, the hash value 604 in the license key 506 is not identical, whereby an unauthorized use is detected by the license file cross-check (1102).

Figure 15:
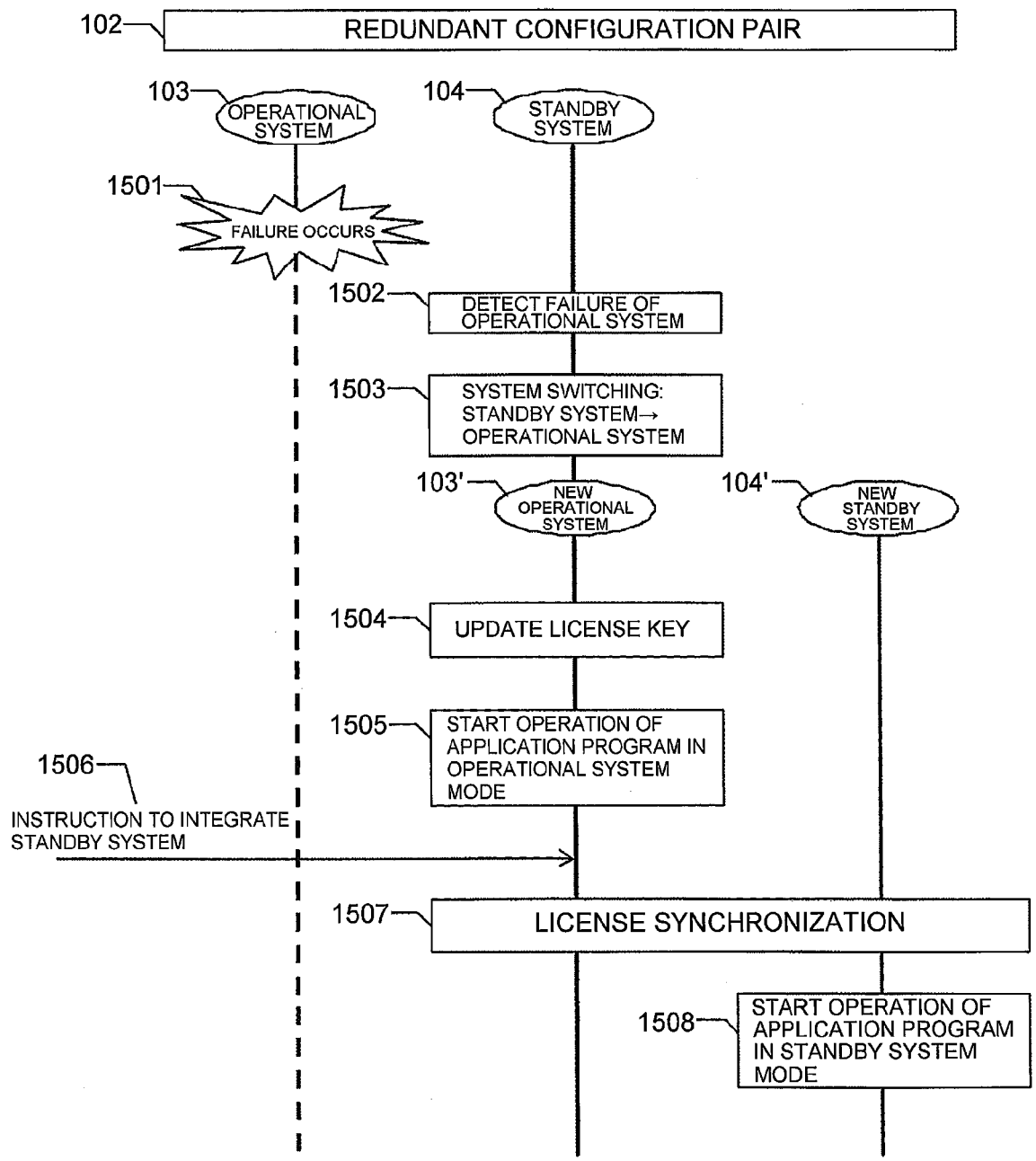
FIG. 15 is a system switching sequence at the time of failure in an operational system server.

If the effect that the license identifier of response data received from a certain device and the license identifier 501 of the license file 301 of the host device coincide with each other (YES in 1407) is notified, it may be regarded that the transmission source device of the received response data uses the license file 301 in an unauthorized manner, and the application program stop instruction may be issued to the transmission source device (1410). It may be regarded that the host device uses the license file 301 in an unauthorized manner, and the application program 302 may be stopped (1411). Furthermore, the application programs 302 of both the transmission source device and the host device may be stopped. Next, a case where the operational system server 103 and the standby system server 104 are switched due to device failure or the like is considered. FIG. 15 shows a switching sequence when the operational system server 103 fails. First, if the operational system server 103 fails (1501), the standby system server 104 detects failure of the operational system server 103 (1502), and performs system switching (1503) to become a new operational system server 103'. Subsequently, the license management unit 402 of the new operational system server 103' updates the license key 506 of the license file 301 (1504), and activates the application program 302.

When the user prepares a new device and integrates the new device as a new standby system server 104', the user issues an instruction to integrate the new standby system server 104' for the new operational system server 103'.

The new operational system server 103' performs license synchronization (1507) using a designated device as the new standby system server 104'. The new standby system server 104' which performs the license synchronization (1507) starts the application program 302 in the standby system-dedicated mode (1508).

The license synchronization (1507) is as shown in FIGS. 9 and 10, and the standby system server 104' updates the license file 302 and overwrites the license file 302 as the license file 302 in the server software 206 of the nonvolatile memory 203.

In this way, the license file can be succeeded from the operational system server to the standby system server (new operational system server), and the new operational system server can newly perform license synchronization with the new standby system server.

Figure 16:
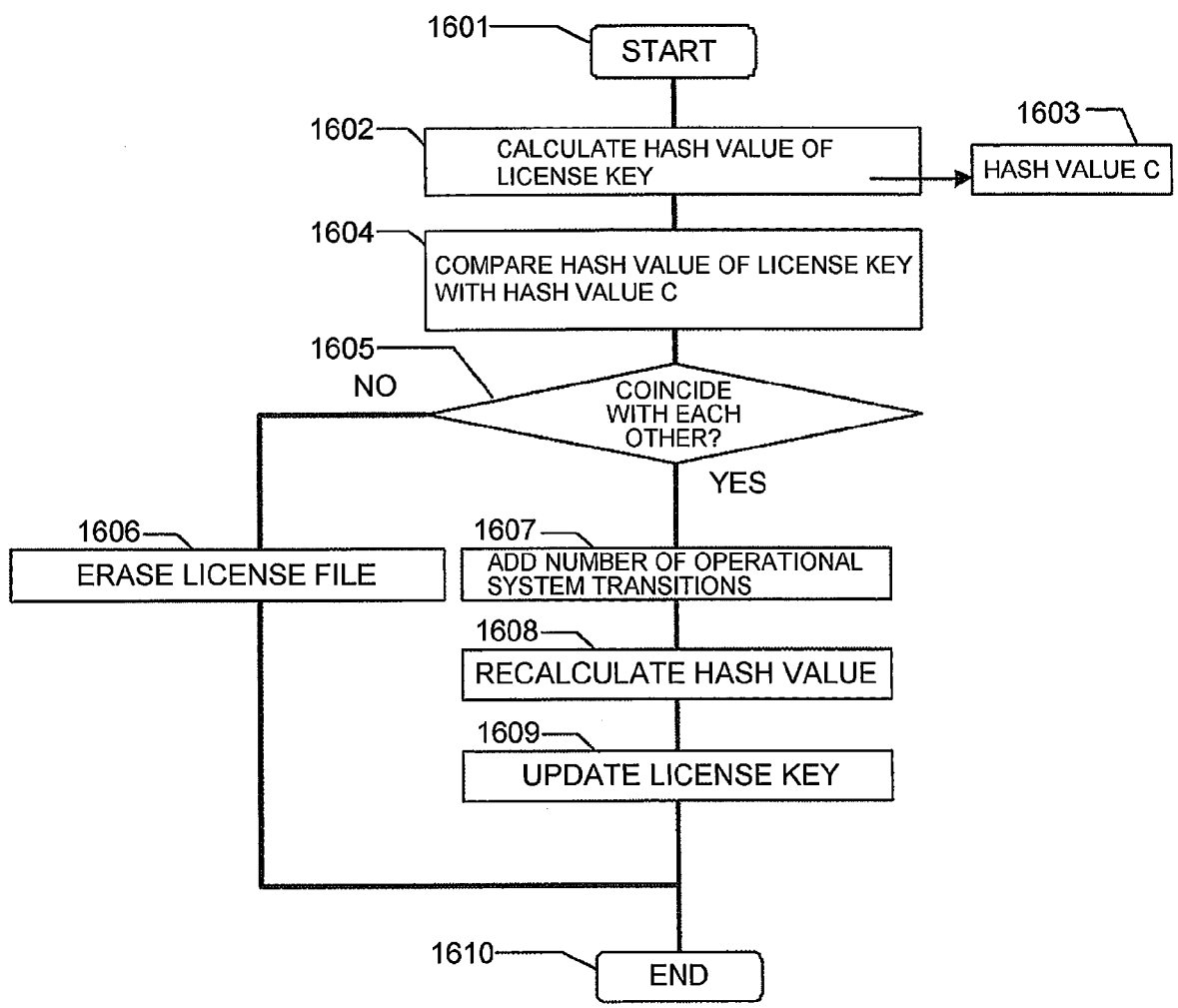
FIG. 16 is a flowchart of update of a license key in system switching at the time of failure in an operational system server.

FIG. 16 is an operation flowchart of the license key update (1504) by the license management unit 402 of the new operational system server 103'. First, a hash value is calculated from the current operational system device identifier 601 of the license key 506, the current standby system device identifier 602, the number of operational system transitions 603, and the seed 403 (1602). This hash value is set as a hash value C (1603). Next, the hash value 604 of the license key 506 and the hash value C (1603) are compared with each other (1604), and if both coincide with each other (YES in 1605), the number of operational system transitions 603 of the license key 506 is added (1607).

A hash value is calculated using the current operational system device identifier 601, the current standby system device identifier 602, the added number of operational system transitions 603, and the seed 403 (1608). This value is set as the hash value 604 of the license key 506 to update the license key 506 (1609), and the processing ends (1610).

When the hash value 604 of the license key 506 and the hash value C (1603) do not coincide with each other (NO in 1605), the license file 301 is erased, and the processing ends (1610).

The number of operational system transitions 603 of the license key 506 of the old operational system server 103 in which failure occurs when the update of the license key 506 is completed is invalid since the value thereof is smaller than the number of operational system transitions 603 of the license key 506 of the new operational system server 103'. Even if the old operational system server 103 is repaired and integrated into the closed network 101 again, in the unauthorized license use monitoring operation (1103) by the new operational system server 103', since the number of operational system transitions 603 of the old operational system server 103 is smaller than the number of operational system transitions 603 of the new operational system server 103', it is regarded as to be an unauthorized use, and the application program 302 of the old operational system server 103 is stopped by the new operational system server 103'.

Figure 17:
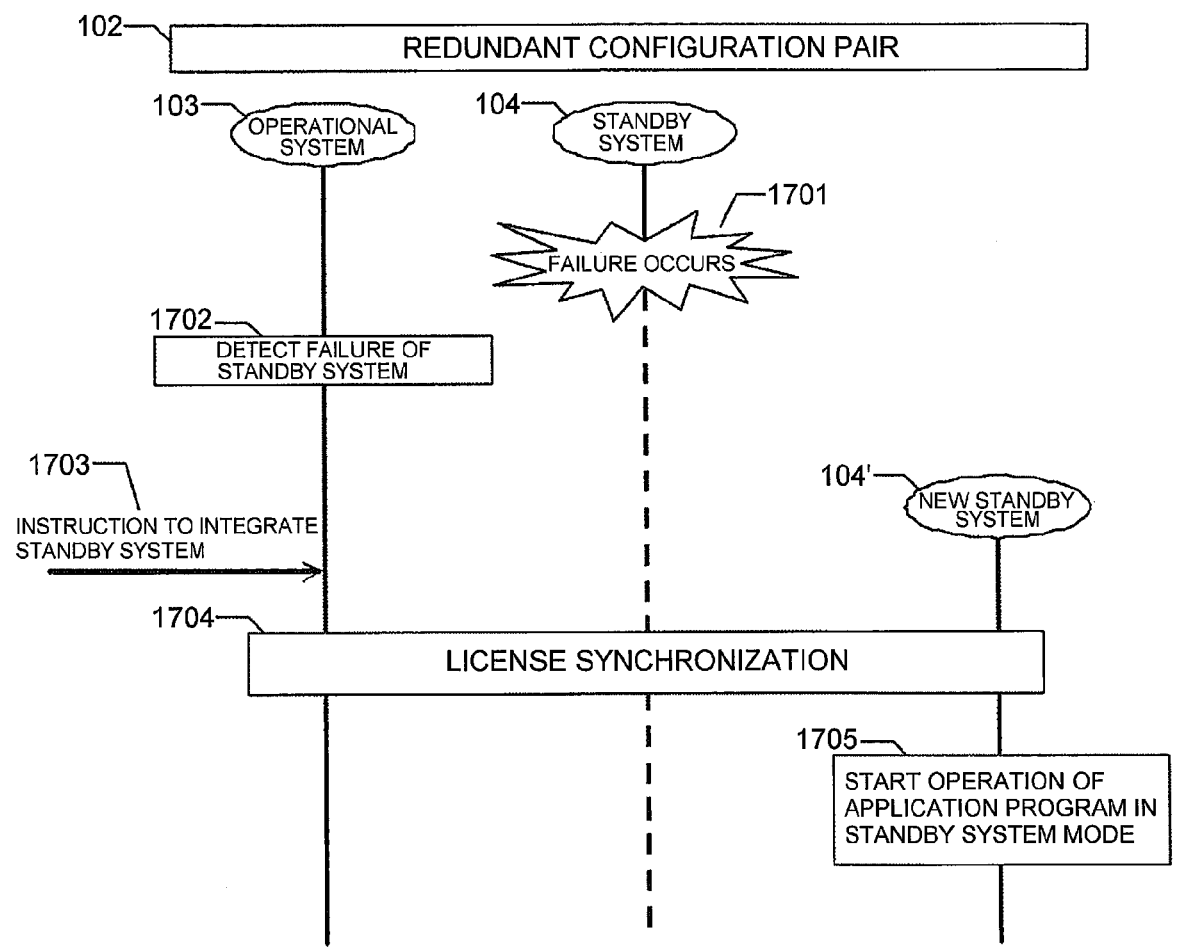
FIG. 17 is a system switching sequence at the time of failure in a standby system server.

Next, FIG. 17 shows a switching sequence when the standby system server 104 fails. If failure occurs in the standby system server 104 (1701), the operational system server 103 detects the failure. At this time, the operational system server 103 does not perform the update of the license key 506, or the like. If the user designates a new standby system server and issues an standby system integration instruction (1703), license synchronization (1704) is performed between the operational system server 103 and the new standby system server 104'. After the license synchronization is completed (1704), the new standby system server 104' starts the operation of the application program 302 in the standby system-dedicated mode (1705).

In this way, the operational system server can perform license synchronization with the new standby system server.

Figure 18:
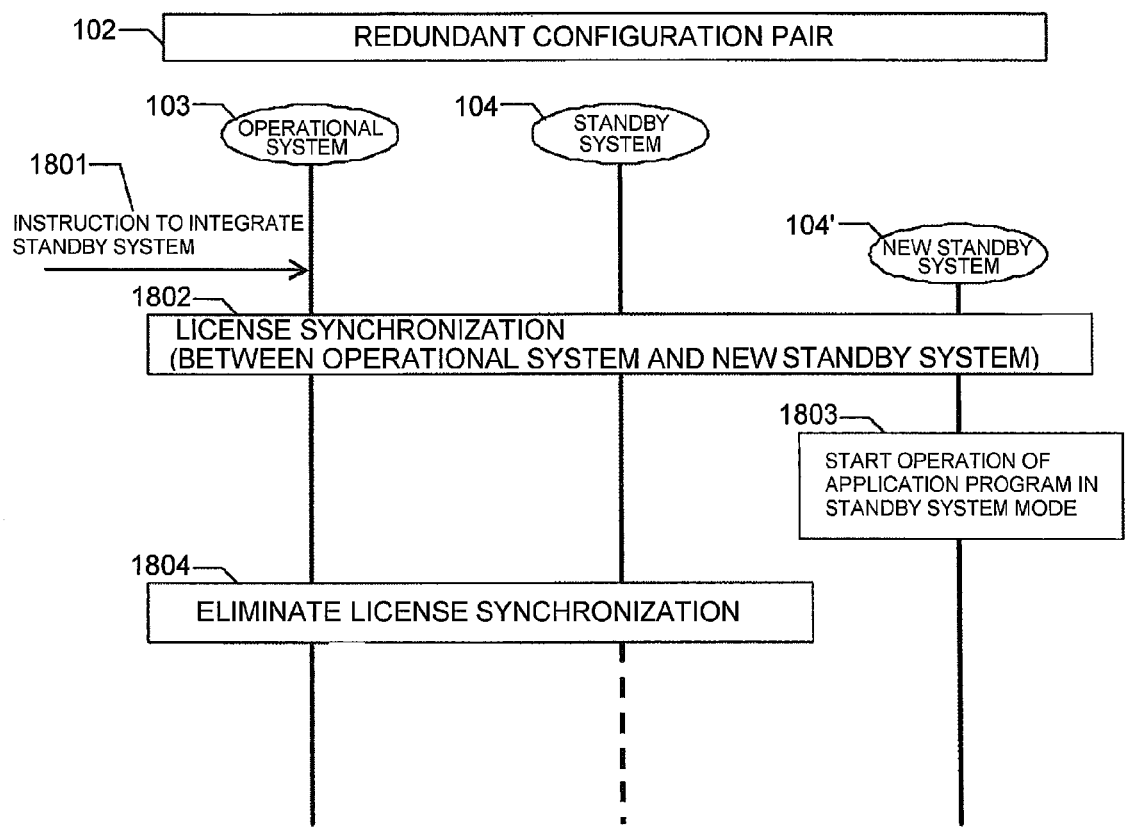
FIG. 18 is a replacement sequence of a standby system server without failure.

FIG. 18 shows a replacement sequence of the standby system server 104 without failure. This is performed for the purpose of, for example, maintenance or the like. If the user designates a new standby system server 104' for the operational system server 103 and issues a standby system integration instruction (1801), license synchronization (1802) is performed between the operational system server 103 and the new standby system server 104'. When the license synchronization (1802) is completed, a new redundant configuration pair shares a new license file 301, whereby the license file 301 of the old standby system server 104 does not correspond to the license file 301 of the operational system server 103 and is invalid. The new standby system server 104' starts the operation of the application program in the standby system-dedicated mode (1803). The license synchronization between the operational system server 103 and the old standby system server 104 is eliminated (1804).

In regard to the operation to eliminate (1804) the license synchronization by the old standby system server 104, the license file 301 is deleted in accordance with the operational system server 103, and the processing ends.

However, the elimination (1804) of the license synchronization is not essential. This is because, even if the elimination (1804) of the license synchronization is not carried out, the license file 301 by the license synchronization (1802) between the operational system server 103 and the new standby system server 104' is updated, whereby the license file 301 of the old standby system server 104 is invalid.

Figure 19:
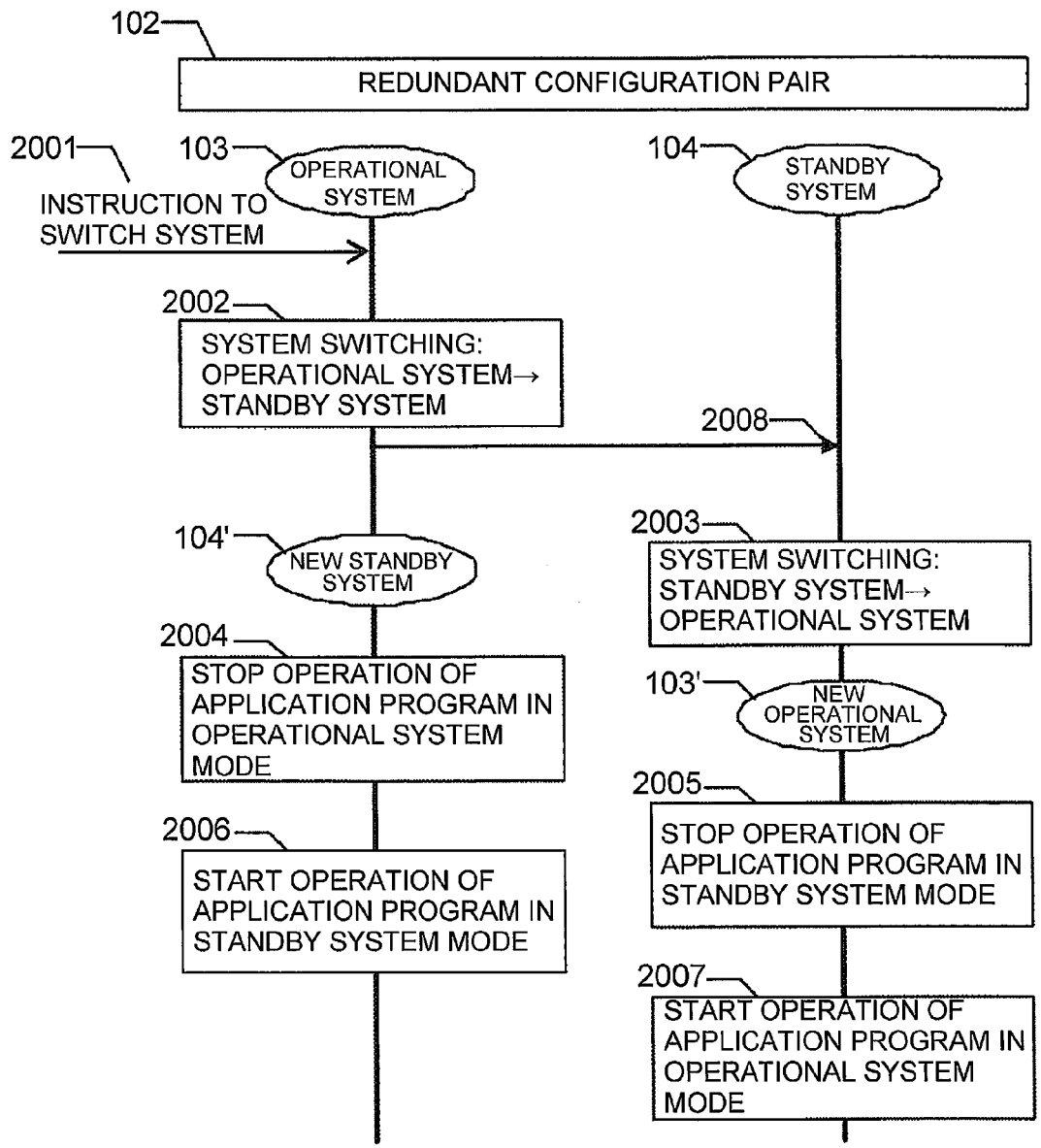
FIG. 19 is a system switching sequence by a user instruction.

FIG. 19 shows a sequence of system switching according to a user instruction. This is performed for the purpose of, for example, maintenance or the like. If the user issues a system switching instruction (2001) to the operational system server 103, the operational system server 103 is switched to the new standby system server 104' (2002) and issues the system switching instruction to the standby system server 104 (2008), and the standby system server 104 receives the system switching instruction and is switched to the new operational system server 103'. When the application program 302 is operated in the standby system-dedicated mode, the license management unit 402 of the new operational system server 103' stops the application program 302 (2005), and starts the operation of the application program 302 in the normal mode (2007). The license management unit 402 of the new standby system server 104' stops the operation of the application program 302 (2005) and starts the operation of the application program 302 in the standby system-dedicated mode (2007). In this way, the operational system server and the standby system server are switched.

Example 2

Figure 20:
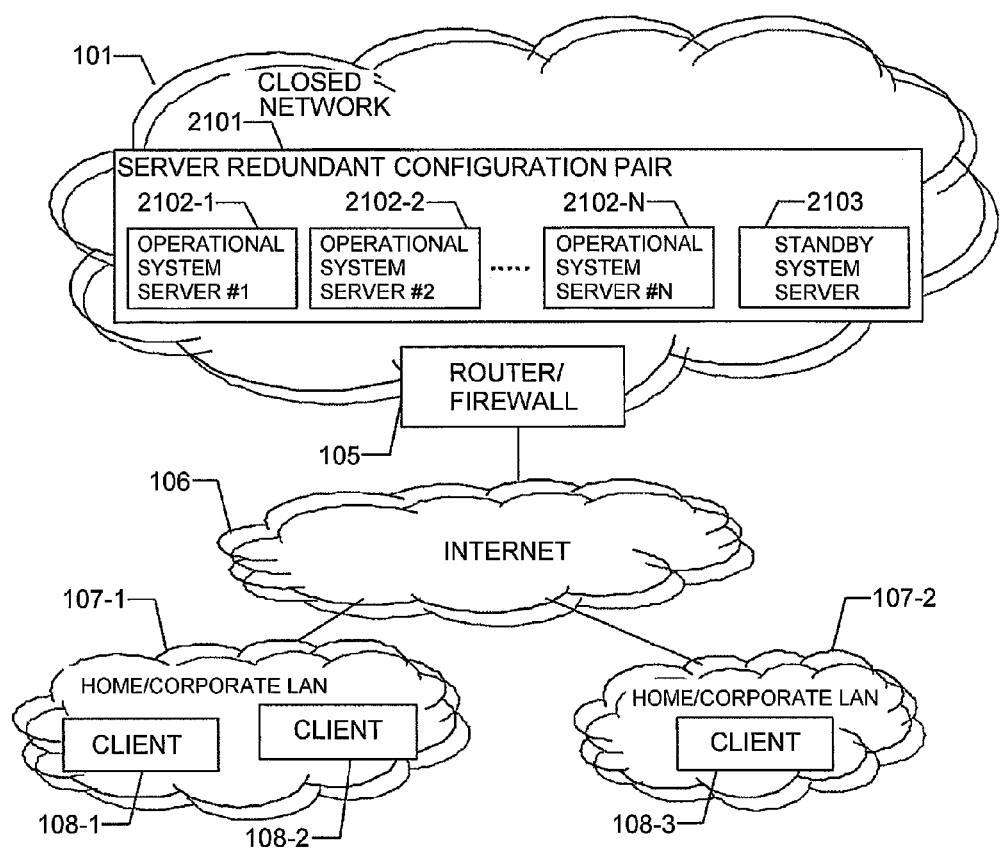
FIG. 20 is a network configuration diagram of Example 2.

FIG. 20 shows a different network configuration in Example 2. With this configuration, in a redundant configuration pair 2101, N operational system servers 2102-1 to 2102-N (where N≥2) are provided, and one standby system server 2103 is provided. In this case, although the license file and the license key has the same configuration as the license file 301 of FIG. 5 and the license key 506 of the FIG. 6 in Example 1, the operational system servers 2102-1 to 2102-N share license files 301 with the standby system server 2103. The standby system server 2103 has the license files 301 for the number of operational system servers.

The license identifier 501, the signature 504, and the license key 506 in the license files 301 have different values between the operational system servers 2102-1 to 2102-N. Although the license synchronization is the same as shown in FIGS. 9 and 10, all operational system servers 2102-1 to 2102-N respectively establish a connection with the standby system server 2103. That is, the standby system server 2103 has N connections. However, the license synchronization, the license file cross-check, and the unauthorized license file use monitoring are the same as the operations of FIGS. 10, 11, 12, 13, and 14 in Example 1 except that the number of operational system servers increases, and these operation flows are carried out between each of the operational system servers 2102-1 to 2102-N and the standby system server 2103.

When one of the operational system servers 2102-1 to 2102-N fails, the operations in which the standby system server 2103 is switched to the operational system server, the designation of a new standby system server is received from the user, and the new standby system server is integrated are the same as FIG. 15 in Example 1. When the standby system server 2103 fails, the switching sequence when the standby system server fails shown in FIG. 17 of Example 1 is carried out for the number of operational system servers. Although the switching sequence of the standby system server without failure is the same as FIG. 18 of Example 1, a standby system integration instruction is required for each of the operational system servers 2102-1 to 2102-N. In regard to the system switching sequence by user designation, the system switching sequence shown in FIG. 19 of Example 1 is performed between a designated operational system server (one of 2102-1 to 2102-N) and the standby system server 2103, and then the standby system replacement sequence shown in FIG. 18 is carried out for all remaining operational system servers.

Although in the examples, the device having the redundant configuration have been described, the invention is not limited to the redundant configuration, and two or three devices may be used.

As described above, it is possible to perform license authentication between a plurality of devices even in a device inside a closed network without separately providing a device managing the license, and if the authentication cannot be performed, to stop the activation of the application program which is executed in each device. Furthermore, even if failure or the like occurs in each device, it is possible to allow license succession.

What is claimed is:
1. An information processing device comprising:
a storage unit which has first device identification information for identifying the information processing device as a host device and an application program executing predetermined processing; and
an authentication management unit which has unique information of the application program,
wherein the authentication management unit acquires second device identification information for identifying another information processing device from another information processing device to be connected to the information processing device through a communication path,
calculates a first value on the basis of the acquired second device identification information, the first device identification information, and the unique information,
generates a first authentication key on the basis of the calculated first value, the first device identification information, and the second device identification information,
transmits the generated first authentication key to another information processing device,
acquires the second device identification information from another information processing device at every predetermined interval,
calculates a second value on the basis of the acquire second device identification information, the first device identification information, and the unique information,
compares the calculated second value with the first value of the first authentication key, and
when the second value does not coincide with the first value, stops the activation of the application program.
2. The information processing device according to claim 1, wherein the storage unit further has first authentication identification information for identifying the first authentication key, and
the authentication management unit transmits a transmission request to transmit second authentication identification information in a storage unit of a different information processing device to the host device having the application program and an information processing device different from another information processing device using a multicast address set in advance,
if the second authentication identification information is received from the different information processing device, compares the received second authentication identification information with the first authentication identification information, and
when the second authentication identification information coincides with the first authentication identification information, transmits a stop instruction to stop the activation of the application program of the different information processing device to the different information processing device.
3. The information processing device according to claim 2, wherein the storage unit further has system information for specifying whether the host device is an operational system or a standby system in a redundant configuration,
the first authentication key has a first number of transitions which is the number of transitions of the operational system to another information processing device and the different information processing device, when the system information specifies the operational system, the authentication management unit includes a request to transmit a second authentication key retained by the different information processing device in the transmission request, if the second authentication identification information and the second authentication key are received from the different information processing device, and when the second authentication identification information coincides with the first authentication identification information, compares a second number of transitions in the received second authentication key with the first number of transitions in the first authentication key, when the second number of transitions is greater than the first number of transitions, transmits the stop instruction, when the second number of transitions is smaller than the first number of transitions, stops the activation of the application program of the host device.

4. The information processing device according to claim 2, wherein the storage unit further has system information for specifying whether the host device is an operational system or a standby system in a redundant configuration, the first authentication key has a first number of transitions which is the number of transitions of the operational system to another information processing device and the different information processing device, and when the system information specifies the operational system, if the second authentication identification information and the second authentication key are received from the different information processing device, and when the second authentication identification information coincides with the first authentication identification information, the authentication management unit further compares a second number of transitions in the received second authentication key with the first number of transitions in the first authentication key, and when the second number of transitions coincides with the first number of transitions, transmits a stop instruction to stop the activation of the application program of the different information processing device to the different information processing device.

5. The information processing device according to claim 2, wherein the storage unit further has system information for specifying whether the host device is an operational system or a standby system in a redundant configuration, when the system information specifies the operational system, if failure occurs in another information processing device as the standby system, the failure is detected, if the host device and another information processing device receive a standby system integration instruction to integrate the different information processing device as the standby system, the authentication management unit acquires third device identification information for identifying the different information processing device from the different information processing device, calculates the first value on the basis of the unique information, the first device identification information, and the third device identification information, and transmits the first authentication key including the calculated first value to the different information processing device.

6. The information processing device according to claim 2, wherein the storage unit further has system information for specifying whether the host device is an operational system or a standby system in a redundant configuration, when the system information specifies the standby system, if failure occurs in another information processing device serving as the operational system, the failure is detected and the system information is changed to the operational system, and the authentication management unit calculates a third value on the basis of the unique information, the first device identification information, and the second device identification information, compares the calculated third value with the first value, when the third value coincides with the first value, starts the activation of the application program, if the host device and another information processing device receive a standby system integration instruction to integrate the different information processing device as the standby system, acquires third device identification information for identifying the different information processing device from the different information processing device, calculates the first value on the basis of the unique information, the first device identification information, and the third device identification information, and transmits the first authentication key including the calculated first value to the different information processing device.

7. A communication system comprising:

a first information processing device;

a second information processing device which is connected to the first information processing device through a communication path, wherein the first information processing device includes a storage unit which has an application program executing predetermined processing and first device identification information for identifying a host device, an authentication management unit which has unique information of the application program, the second information processing device includes a storage unit which has the application program and second device identification information for identifying a host device, and an authentication management unit which has the unique information, the authentication management unit of the first information processing device acquires the second device identification information from the second information processing device, calculates a first value on the basis of the acquired second device identification information, the first device identification information, and the unique information of the host device, generates a first authentication key on the basis of the calculated first value, the first device identification information, and the second device identification information, transmits the generated first authentication key to the second information processing device, acquires the second device identification information from the second information processing device for each predetermined period, calculates a second value on the basis of the acquired second device identification information, the first device identification information, and the unique information of the host device, compares the calculated second value with the first value of the first authentication key, and when the second value does not coincide with the first value, stops the activation of the application program, and if the first authentication key is received from the first information processing device, the authentication management unit of the second information processing device stores the received first authentication key in the storage unit of the host device, acquires the first device identification information from the first information processing device for each predetermined period, calculates a third value on the basis of the acquired first device identification information, the second device identification information of the host device, and the unique information of the host device, compares the calculated third value with the first value included in the stored first authentication key, and when the third value does not coincide with the first value, transmits a stop instruction to stop the activation of the application program of the first information processing device.

8. The communication system according to claim 7, wherein the storage unit of the first information processing device further has first authentication identification information for identifying the first authentication key, and the authentication management unit of the first information processing device transmits a transmission request to transmit second authentication identification information in a storage unit of another information processing device to another information processing device having the application program using a multicast address set in advance, if the second authentication identification information is received from another information processing device, compares the received second authentication identification information with the first authentication identification information, and when the second authentication identification information coincides with the first authentication identification information, transmits a stop instruction to stop the activation of the application program of another information processing device to the third information processing device.

9. The communication system according to claim 8, wherein the storage unit of the first information processing device further has system information for specifying whether the host device is an operational system or a standby system in a redundant configuration, the first authentication key of the first information processing device has a first number of transitions which is the number of transitions of the operational system to the second information processing device and the third information processing device, and the authentication management unit of the first information processing device includes a request to transmit a second authentication key retained in another information processing device in the transmission request, if the second authentication identification information and a second authentication key are received from another information processing device, compares the received second authentication identification information with the first authentication identification information, when the second authentication identification information coincides with the first authentication identification information, compares a second number of transitions in the received second authentication key with the first number of transitions in the first authentication key, when the second number of transitions is greater than the first number of transitions, transmits a stop instruction to stop the activation of the application program of another information processing device to another information processing device, and when the second number of transitions is smaller than the first number of transitions, stops the activation of the application program of the host device.

10. The communication system according to claim 9, wherein, when the system information of the host device specifies the operational system, if failure occurs in the second information processing device serving as the standby system, the first information processing device detects the failure, and if a standby system integration instruction to integrate a third information processing device as the standby system is received, the authentication management unit of the first information processing device acquires third device identification information for identifying the third information processing device from the third information processing device, calculates the first value on the basis of the unique information of the host device, the first device identification information, and the third device identification information, and transmits the first authentication key including the calculated first value to the third information processing device.

* * * * *